US012729593B2

(12) United States Patent
Belshan et al.

(10) Patent No.: US 12,729,593 B2
(45) Date of Patent: Sep. 8, 2026

(54) VALVE CARTRIDGE

(71) Applicant: SPM Oil & Gas Inc., Fort Worth, TX (US)

(72) Inventors: Daryl James Belshan, Weatherford, TX (US); David Theodore Figgs, Fort Worth, TX (US); Justin Lane Poehls, Glen Rose, TX (US); Abraham E. Canales, Fort Worth, TX (US)

(73) Assignee: SPM Oil & Gas Inc., Fort Worth, TX (US)

(*) Notice: Subject to any disclaimer, the term of this patent is extended or adjusted under 35 U.S.C. 154(b) by 0 days.

(21) Appl. No.: 19/245,689

(22) Filed: Jun. 23, 2025

(65) Prior Publication Data

US 2025/0314143 A1 Oct. 9, 2025

Related U.S. Application Data

(63) Continuation of application No. 18/216,173, filed on Jun. 29, 2023, now Pat. No. 12,359,517.

(51) Int. Cl.

*E21B 21/10* (2006.01)
*E21B 43/26* (2006.01)
*F16K 15/02* (2006.01)

(52) U.S. Cl.

CPC ........ *E21B 21/106* (2013.01); *E21B 43/2607* (2020.05); *F16K 15/026* (2013.01); *Y10T 137/4351* (2015.04); *Y10T 137/86718* (2015.04); *Y10T 137/87877* (2015.04)

(58) Field of Classification Search

CPC .. E21B 21/106; E21B 43/2607; F16K 15/026; Y10T 137/4351; Y10T 137/86718; Y10T 137/87877

See application file for complete search history.

(56) References Cited

U.S. PATENT DOCUMENTS

| | | | |
|---|---|---|---|
| 2,841,092 | A | 7/1958 | Whiteman et al. |
| 3,565,100 | A | 2/1971 | Pfleger |
| 4,508,133 | A | 4/1985 | Hamid |
| 4,520,837 | A | 6/1985 | Cole et al. |
| 4,573,886 | A | 3/1986 | Maasberg et al. |
| 5,073,096 | A | 12/1991 | King et al. |
| 5,174,327 | A | 12/1992 | Truax et al. |

(Continued)

FOREIGN PATENT DOCUMENTS

| | | | |
|---|---|---|---|
| CN | 206753561 | U | 12/2017 |
| WO | WO-2022/166096 | A1 | 8/2022 |

OTHER PUBLICATIONS

US Final Office Action in U.S. Appl. No. 18/216,173 dated Nov. 27, 2024.

(Continued)

*Primary Examiner* — Craig M Schneider
*Assistant Examiner* — Christopher D Ballman

(57) ABSTRACT

A valve cartridge for a fluid end for a well stimulation pump optionally includes: a valve body, a spring engaging the valve body on a first side thereof, and a housing at least partially enclosing the valve body and spring. The housing can define one or more passages therethrough. The housing can define one or more seats adjacent the one or more passages. The one or more seats can be configured to be selectively engaged by the valve body on a second side thereof.

16 Claims, 11 Drawing Sheets

(56) References Cited

U.S. PATENT DOCUMENTS 5,253,987 A * 10/1993 Harrison ............... F16K 15/025 417/571
5,362,215 A * 11/1994 King ....................... F04B 49/10 137/542
6,796,321 B2 9/2004 Vicars
7,335,002 B2 2/2008 Vicars
7,364,412 B2 4/2008 Kugelev et al.
8,522,824 B2 9/2013 Feldmeier
8,784,081 B1 7/2014 Blume
9,284,953 B2 3/2016 Blume
9,739,130 B2 8/2017 Young
9,822,894 B2 * 11/2017 Bayyouk ............. F04B 53/1087
10,082,137 B2 9/2018 Graham et al.
10,302,224 B2 5/2019 Kluz et al.
10,760,567 B2 * 9/2020 Salih ....................... F04B 47/02
10,941,866 B2 3/2021 Nowell et al.
11,042,169 B2 6/2021 Perry et al.
11,111,915 B2 * 9/2021 Bayyouk ............... F16K 17/162
11,353,117 B1 6/2022 Smith
11,384,756 B1 7/2022 Smith
11,421,679 B1 8/2022 Mullins et al.
11,434,900 B1 9/2022 Alex et al.
11,448,210 B2 * 9/2022 Bayyouk ................. F16K 1/385
11,585,455 B2 2/2023 Bayyouk et al.
11,614,079 B2 3/2023 Poehls et al.
11,852,127 B2 12/2023 Barnhouse et al.
12,012,954 B2 6/2024 Thomas et al.
12,066,021 B2 * 8/2024 Poehls .................... F04B 53/22
2007/0295411 A1 * 12/2007 Schwegman ......... F16K 15/063 137/542
2008/0213112 A1 9/2008 Lucas
2011/0206546 A1 8/2011 Vicars
2012/0141308 A1 * 6/2012 Saini ................... F04B 53/1025 977/773
2014/0086774 A1 * 3/2014 Chandrasekaran ... F04B 39/125 137/543.13
2017/0146011 A1 5/2017 Hiller
2018/0291892 A1 10/2018 Vicars
2019/0072088 A1 * 3/2019 DeLeon, II ............. F04B 53/16
2019/0376508 A1 * 12/2019 Wagner ..................... F16K 1/38
2021/0316430 A1 10/2021 Poehls et al.
2022/0325810 A1 10/2022 Morris et al.
2022/0390029 A1 12/2022 Pendleton et al.
2022/0390031 A1 12/2022 Pendleton et al.

OTHER PUBLICATIONS

US Non-Final Office Action in U.S. Appl. No. 18/216,173 dated Sep. 26, 2024.

* cited by examiner

300

302

PROVIDE VALVE CARTRIDGE AS A UNITARY APPARATUS COUPLED TO FLUID END

304

REMOVE VALVE CARTRIDGE AS SINGLE UNIT FROM THE FLUID END WITHOUT DISASSEMBLY OF COMPONENTS PARTS THEREOF

VALVE CARTRIDGE

CROSS-REFERENCE TO RELATED APPLICATION

This application is a continuation of U.S. patent application Ser. No. 18/216,173, filed Jun. 29, 2023, which is hereby incorporated by reference in its entirety.

TECHNICAL FIELD

The present application relates generally to a valve cartridge. More particularly, the present application relates to a valve cartridge(s) that can be used in a fluid end for a well stimulation pump.

BACKGROUND

Subterranean hydraulic fracturing is conducted to increase or stimulate production from a hydrocarbon well. To conduct a fracturing process, high pressures are used to pump special fracturing slurry fluids, down the well-bore and into a hydrocarbon formation to split or "fracture" the rock formation along veins or planes extending from the well-bore. Plunger pumps are commonly used in the oil and gas industry for hydraulic fracturing purposes. Plunger pumps have a fluid end and a power end that drives the fluid end.

Hydraulic fracturing operations requires large volumes of slurry fluids, which are corrosive and abrasive to equipment such as plunger pumps and fluid ends. Additionally, the high pressures utilized create high stresses on component parts. Fluid ends in the environment must be serviced and replaced periodically, at time and labor cost. Typically, current valves used in fluid ends are difficult to access and the components of the valve must be disassembled within the fluid end in a piece-by-piece manner. Thus, such replacement can be time consuming and labor intensive.

PCT Publication No. WO 2022/166096 to Li et al. and U.S. Pat. No. 10,082,137 B2 to Graham et al. each describe a fluid end and a plunger pump. As shown in FIG. 1B of the '096 Publication and FIG. 2 of the '137 patent, the fluid end utilizes a typical valve design where the valve has several components including two or more segmented/separated housing sections. This valve design can be difficult to access and the components of the valve must be disassembled within the fluid end and removed piece-by-piece.

SUMMARY OF THE INVENTION

In one example, the techniques described herein relate to a valve cartridge for a fluid end for a well stimulation pump. The valve cartridge optionally includes: a valve body, a spring engaging the valve body on a first side thereof, and a housing at least partially enclosing the valve body and spring. The housing can define one or more passages therethrough. The housing can define one or more seats adjacent the one or more passages. The one or more seats can be configured to be selectively engaged by the valve body on a second side thereof.

In another example, the techniques described herein relate to a valve cartridge for a fluid end for a well stimulation pump. The valve cartridge optionally includes: a valve body, a spring engaging the valve body on a first side, a retainer engaging the spring on a second side, and a housing at least partially enclosing the valve body, the spring and the retainer. The housing can define one or more passages therethrough. The housing defines one or more seats that can be configured to be selectively engaged by the valve body on a second side thereof. The valve cartridge is a unitary apparatus that can be configured to be installable into the fluid end or removable from the fluid end as a single unit.

In some aspects, the techniques described herein relate to a method of servicing a valve cartridge for a fluid end for a well stimulation pump. The method can optionally include: providing the valve cartridge as a unitary apparatus coupled to the fluid end, the valve cartridge having a housing at least partially enclosing a valve body and a spring, the housing defining one or more passages therethrough, wherein the housing defines one or more seats adjacent the one or more passages, wherein the one or more seats are configured to be selectively engaged by the valve body; and removing the valve cartridge as single unit from the fluid end without disassembling the housing, the valve body and the spring.

DETAILED DESCRIPTION

Figure 1:
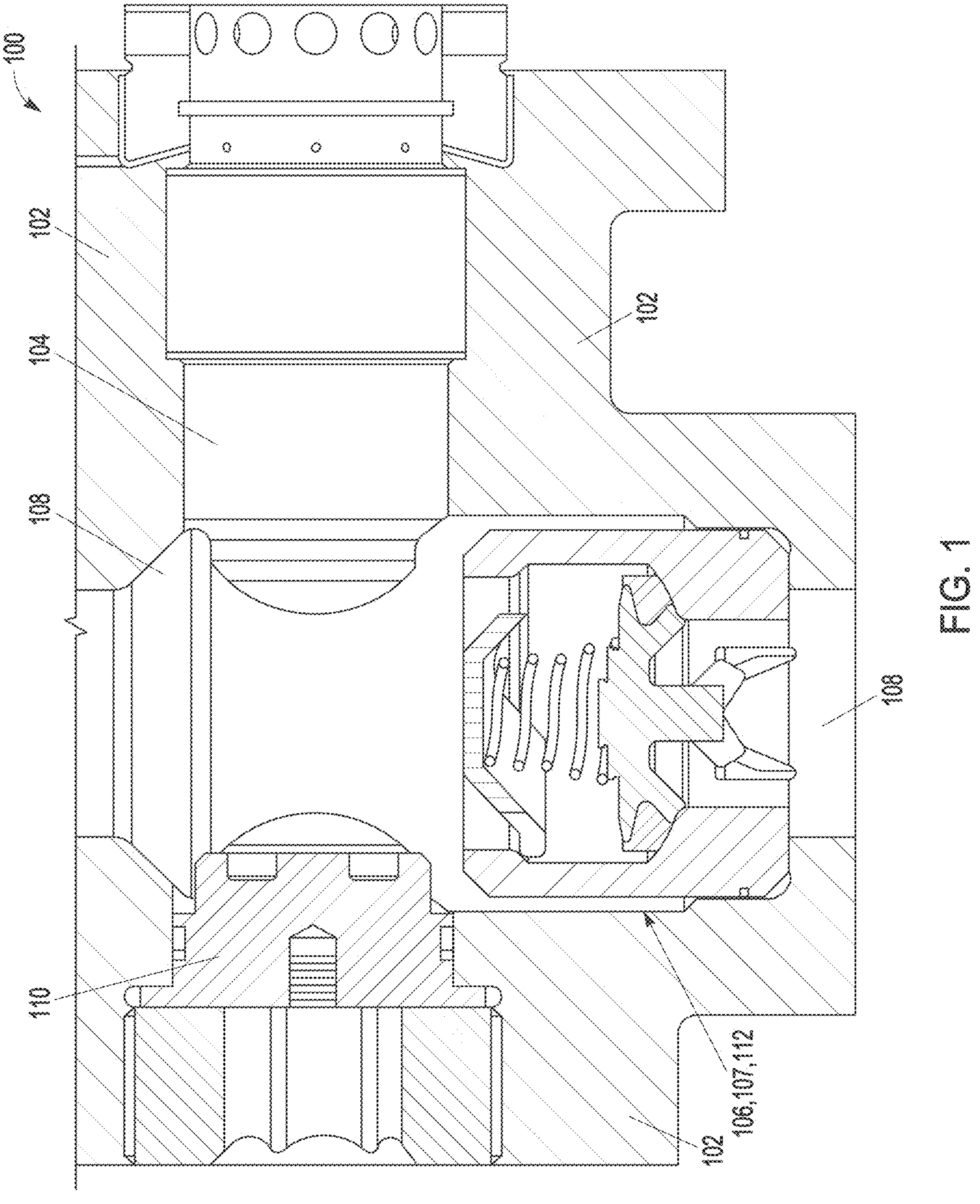
FIG. 1 is a cross-sectional view of a portion of a fluid end for a well stimulation pump in accordance with an example of the present disclosure.

FIG. 1 is a cross-sectional view of a portion of a fluid end 100 according to an example of the present disclosure. As shown, the fluid end 100 includes a fluid end housing 102 and a compression chamber 104 (sometimes referred to as a plunger bore). A plunger (not shown) is moveable in the compression chamber 104 as further discussed herein. The fluid end 100 can include a valve cartridge 106. The valve cartridge 106 can be part of a discharge valve assembly or a suction valve assembly positioned in or in fluid communication with a conduit 108. FIG. 1 shows the valve cartridge 106 as the suction valve assembly 107, although use of the valve cartridge 106 as the discharge valve assembly is also contemplated. The fluid end 100 can include a suction plug 110 in fluid communication with the compression chamber 104.

The fluid end housing 102 may enclose or support some or all of the components of the fluid end 100. Although not specifically shown, the plunger may be actuated in a reciprocating fashion in and out of the compression chamber 104. The compression chamber 104 can be in fluid communication with the valve cartridge 106, the conduit 108 and the suction plug 110. Although not specifically shown, the fluid end 100 can include a plurality of plungers, compression areas, valve cartridges, conduits and suction plug assemblies with the fluid end housing 102 designed to accommodate the plurality of components.

The suction plug 110 may be located at the opposite end of fluid end housing 102 from the plunger (not shown). The suction plug 110 can be positioned in an access port or other feature of the fluid end housing 102. The valve cartridge 106 can be located adjacent and perpendicular from the suction plug 110. The suction plug 110 may be in fluid communication with the valve cartridge 106 via the compression chamber 104 and the conduit 108. The valve cartridge 106 can be located in a port or cavity in the fluid end housing 102. The valve cartridge 106 can be held in position and is in fluid communication with the fluid end housing 102.

The valve cartridge 106 is a unitary apparatus 112 that is configured to be selectively removable from the fluid end 100 including the fluid end housing 102 as a single unit as further discussed herein.

Figure 1A:
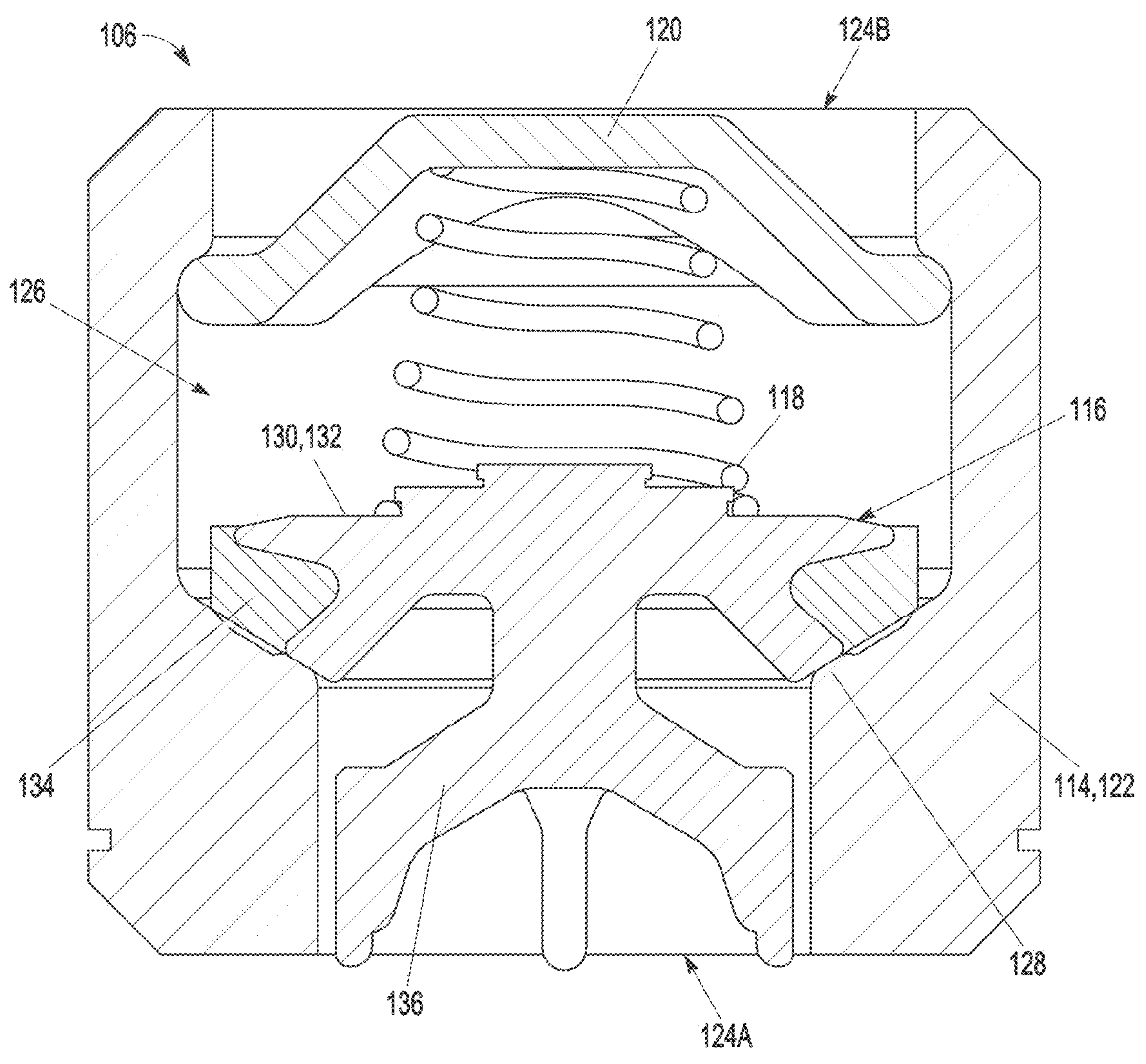
FIG. 1A is an enlarged cross-sectional view of a valve cartridge for the fluid end of FIG. 1.
Figure 2:
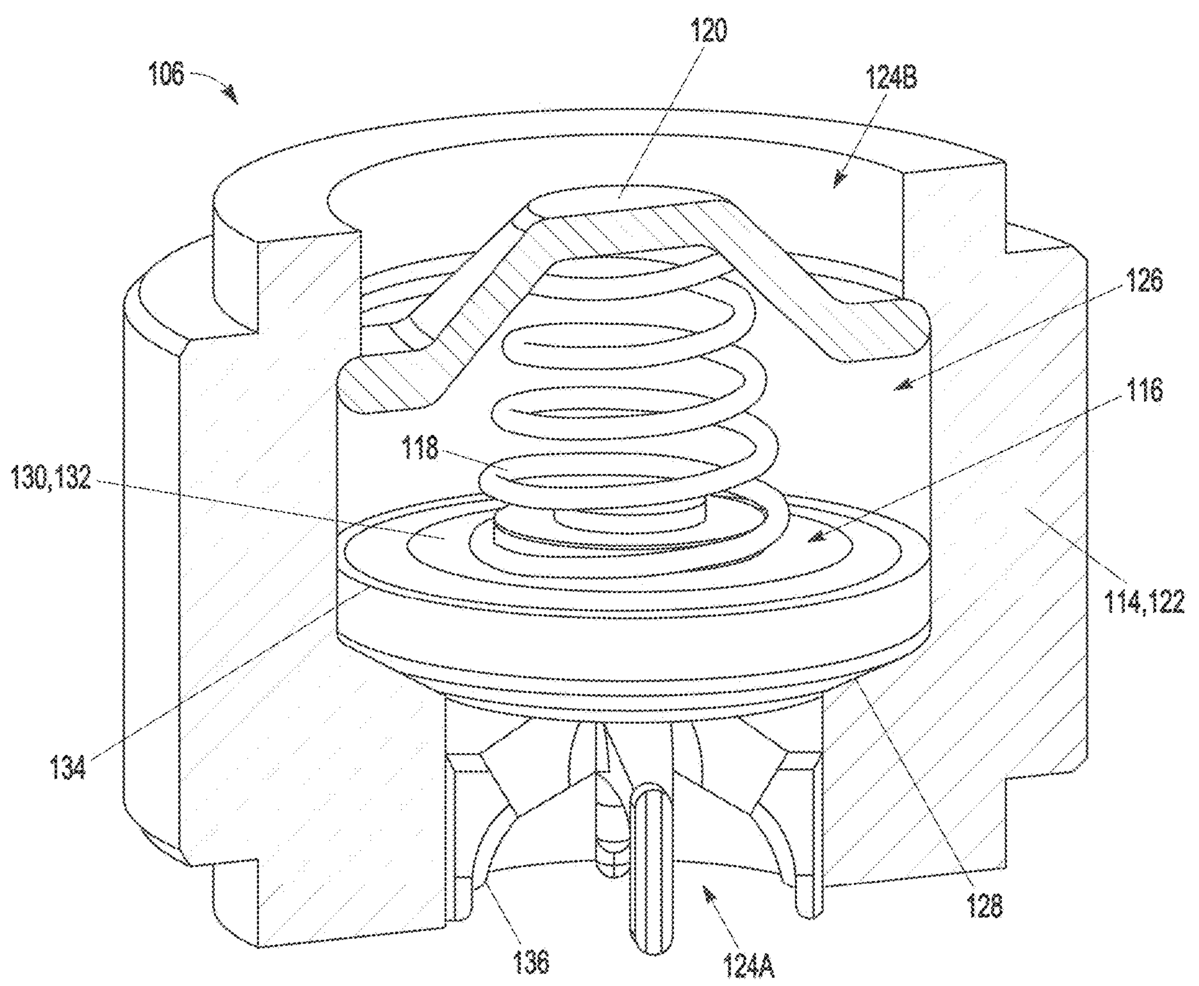
FIG. 2 is a perspective view of a partial cross-section of the valve cartridge of FIG. 1A.

FIG. 1A shows an enlarged cross-section of the valve cartridge 106. FIG. 2 shows perspective view of a cross-section of the valve cartridge 106. The valve cartridge 106 can include a housing 114, a valve body 116, a spring 118 and a retainer 120. The housing 114 can include a sidewall 122 and can form one or more passages 124A and 124B, a chamber 126 and one or more seats 128. The valve body 116 can include a first portion 130 with a first side 132, a second portion 134, and a third portion 136.

The housing 114 can have a single or multi-piece construction formed of suitable material such as metal, metal alloy or the like. The housing 114 can include the sidewall 122, which can be solid, enclosing the chamber 126, the valve body 116 and the spring 118. However, other examples contemplate the sidewall 122 can have ports or an open frame construction with passages therethrough. The sidewall 122 can extend between the one or more passages 124A on a first end and the one or more passages 124B on a second opposing end. The sidewall 122 can form and enclose the chamber 126. The housing 114 can at least partially enclose the valve body 116, the spring 118 and the retainer 120. The housing 114 can form the one or more passages 124A and 124B that extend therethrough. The housing 114 can additionally form the chamber 126 and the one or more seats 128. The one or more seats 128 can be adjacent to and can in some examples form or partially form the one or more passages 124A, for example. The one or more seats 128 can be configured (size, shaped, positioned, etc.) to be selectively engaged by the valve body 116. The one or more seats 128 can be a tapered and/or can be a restricted section of the housing 114, for example.

The valve body 116 can be moveably positioned within the housing 114, in particular, within the chamber 126. The first portion 130 of the valve body 116 can be engaged by the spring 118 on the first side 132. Features of the first side 132 can be configured for retaining the spring 118. The first portion 130 can be configured (sized, shaped, positioned, etc.) to engage, interface and otherwise selectively interact with the one or more seats 128 to regulate a flow of the slurry fluid. The first portion 130 can be made of a suitable material such as a metal or metal alloy. The second portion 134 can be a sleeve, coating, over-mold or other component formed of a different material such as urethane configured to aid in forming a seal with the one or more seats 128 when in the closed position (sealed position) of FIGS. 1A and 2. The one or more seats 128 can have a groove or other relief to avoid sticking with the second portion 134. The third portion 136 can extend from the first portion 130 into the one or more passages 124A. The third portion 136 can be formed as a single piece with the first portion 130 and can be configured for being received by the one or more passages 124A.

The spring 118 can engage the valve body 116 at the first side 132. A second end of the spring 118 can engage the retainer 120. The spring 118 can be configured as a bias element to force the valve body 116 toward and to the closed position (sealed position) shown in FIGS. 1A and 2. However, the spring 118 force can be overcome. This results in compression of the spring 118 and movement of the valve body 116 off the one or more seats 128 to allow for passage of the slurry fluid from the one or more passages 124A into the chamber 126 and on through the one or more passages 124B.

The retainer 120 can be positioned at least partially in the chamber 126. The retainer 120 can be a dedicated component separate from the housing 114. The housing 114 can be configured to couple with the retainer 120, such as via press-fit or other connection. The housing 114 can have feature(s) such as grooves, projections, etc. for coupling of the retainer 120 within the housing 114. Although the retainer 120 is shown as a separate element from the housing 114, the retainer 120 can be part of or a feature of the housing 114 according to other examples.

Figure 2B:
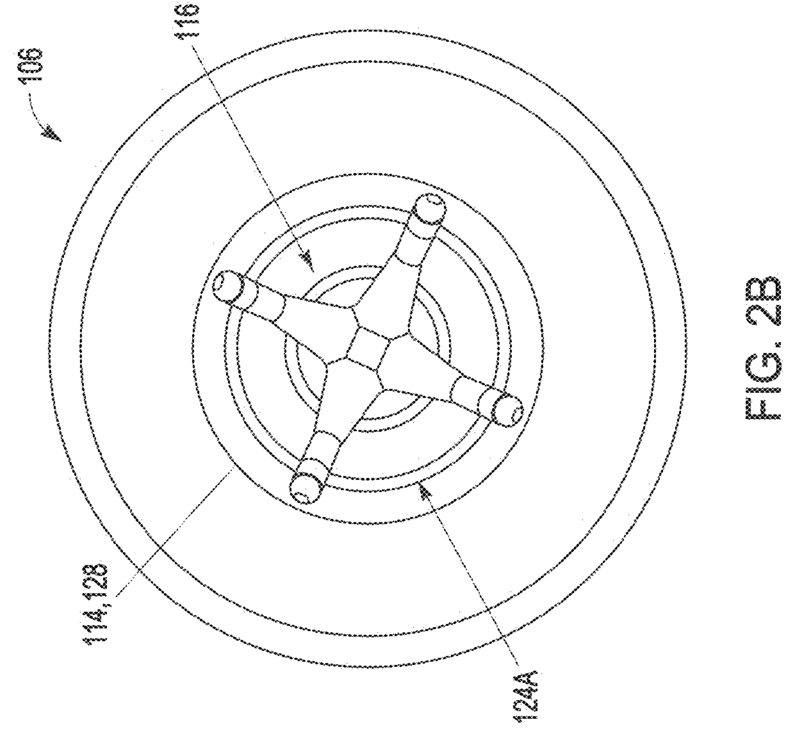
FIG. 2B is a plan view of a first side of the valve cartridge of FIGS. 1A-2A.
Figure 2A:
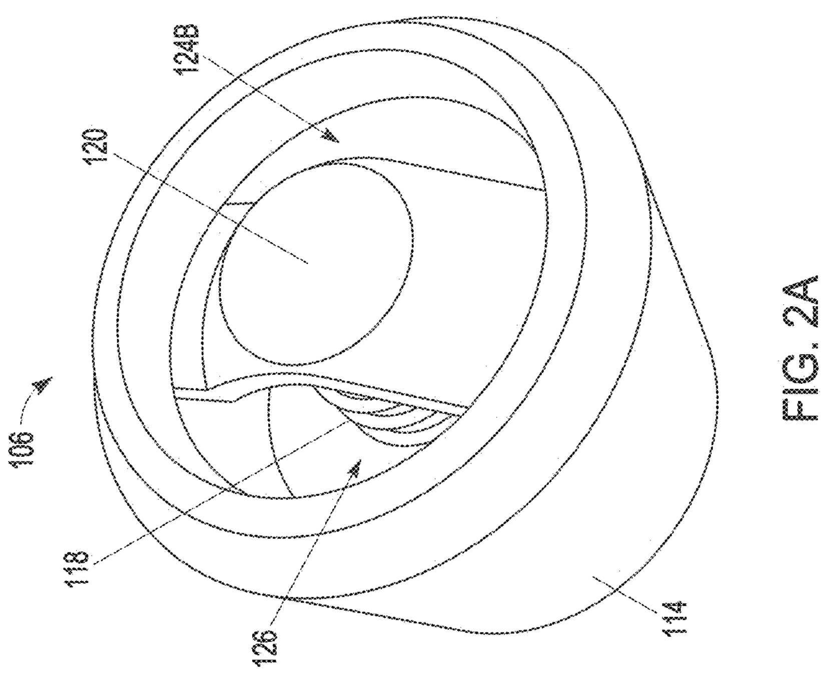
FIG. 2A is a perspective view of the valve cartridge of FIGS. 1A and 2.

FIG. 2A is a perspective view of the valve cartridge 106 showing the one or more passages 124B, the retainer 120, the housing 114 and the spring 118. The retainer 120 can be shaped to capture the spring 118 but also can allow for passage of the slurry fluid from the chamber 126 through the one or more passages 124B.

FIG. 2B is a plan view of the valve cartridge 106 including the one or more passages 124A, the valve body 116 within and adjacent the passages 124A and the one or more seats 128. The one or more seats 128 can be configured to form an end plate for the housing 114. The valve body 116 can at least be partially positioned in the one or more passages 124A and/or the one or more seats 128 as discussed previously.

Figure 3:
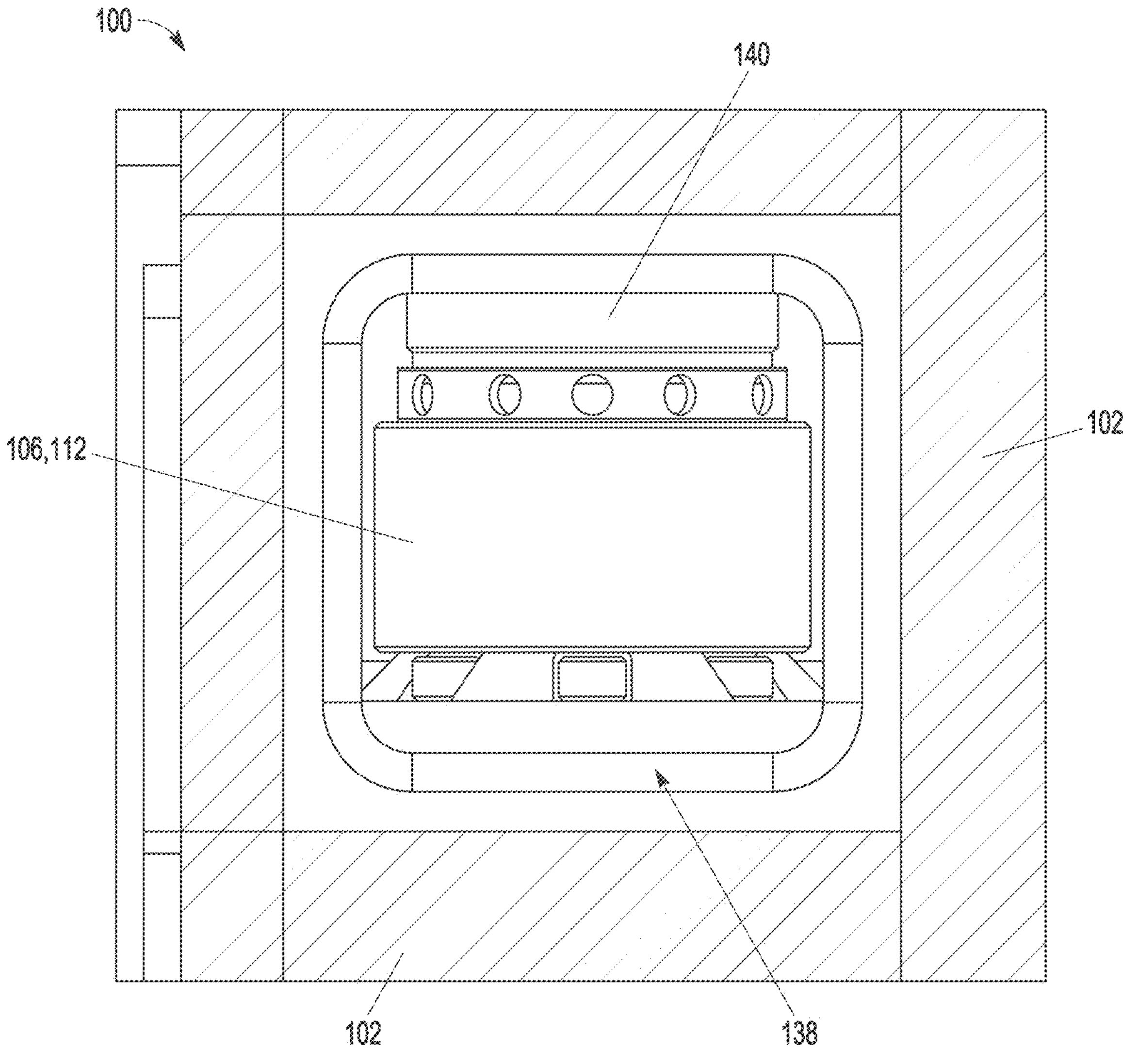
FIG. 3 is a side view of the valve cartridge of FIGS. 1A-2B positioned in the fluid end and accessible via a window of the fluid end of FIG. 1.

FIG. 3 shows part of the fluid end 100 including the fluid end housing 102, which can have a dedicated port or window 138. The dedicated port or window 138 can be used for accessing the valve cartridge 106 within the fluid end 100 for service. The valve cartridge 106 can be retained and coupled to the fluid end 100 by one or more nuts 140 or other coupling mechanisms. The one or more nuts 140 can be freely accessible via the port or window 138. Once the one or more nuts 140 are decoupled from the valve cartridge 106, the one or more nuts 140 and the valve cartridge 106 can be removed via the port or window 138 as a single unit. Although an example of a port or window 138 is illustrated in FIG. 3, other examples of the present application contemplate that the fluid end 100 is configured such that valve cartridge 106 can be removable without use of the port or window 138 but by simply decoupling of the valve cartridge 106 from the fluid end housing 102 chamber in which the valve cartridge 106 is positioned and by removing the valve cartridge 106 from the chamber in which the valve cartridge 106 was received. However, the present disclosure contemplates that the valve cartridge 106 is the unitary apparatus 112. This unitary construction allows the valve cartridge 106 including the housing 114, the valve body 116 (FIGS. 1A and 2), the spring 118 (FIGS. 1A and 2) and any other internal components of the valve cartridge 106 to be removable as a single unit rather than component(s) of the valve cartridge 106 being disassembled and removed piece-by-piece.

Figure 4:
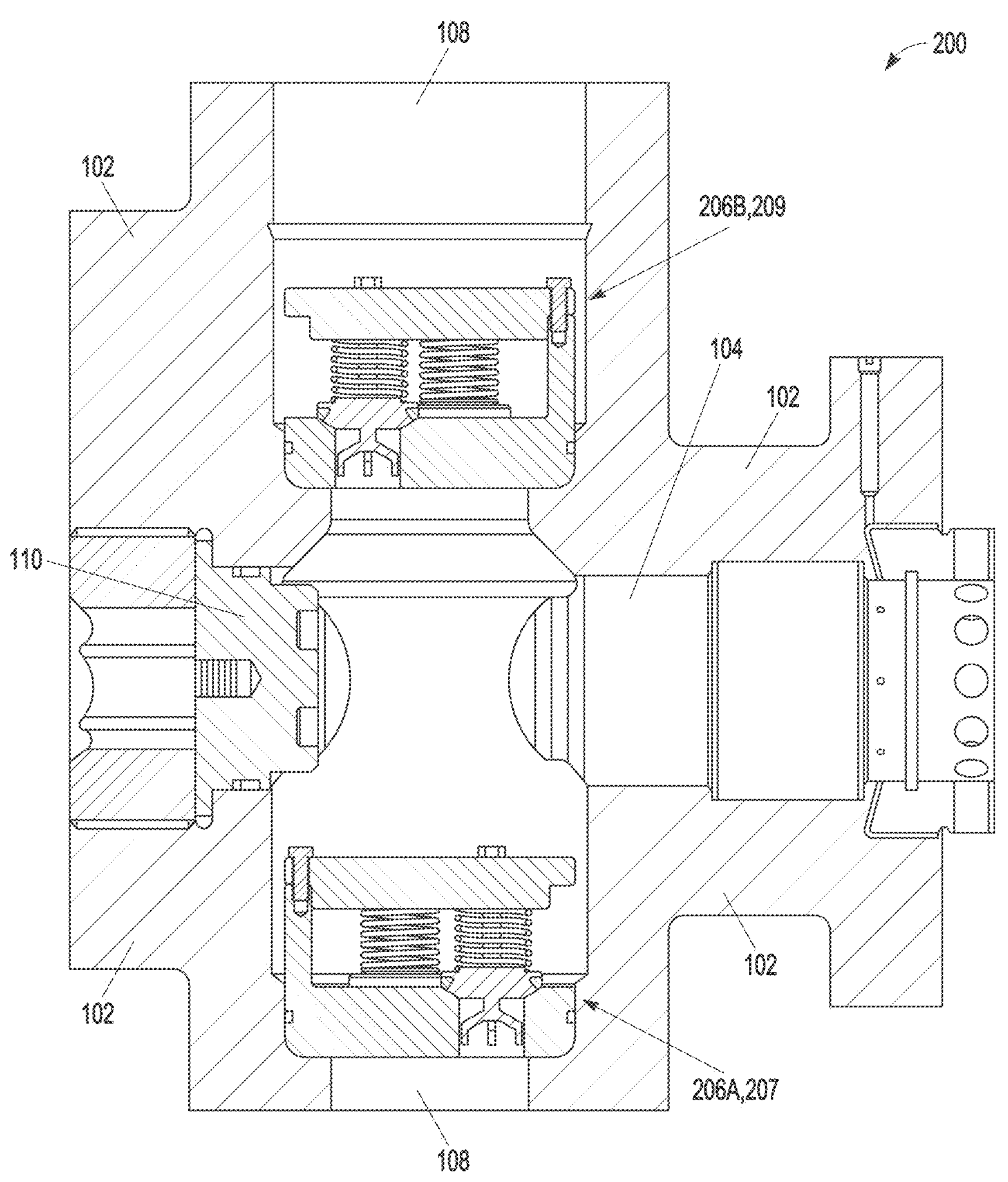
FIG. 4 is a cross-sectional view a second fluid end for a well stimulation pump according to another example of the present disclosure.

FIG. 4 is a cross-sectional view of a portion of a fluid end 200 according to a second example of the present disclosure. The fluid end 200 can have a similar construction to that of the fluid end 100 of FIG. 1. Thus, the fluid end 200 can include the fluid end housing 102, the compression chamber 104, conduits 108 and the suction plug 110 as previously discussed. However, the fluid end 200 includes valve cartridges 206A and 206B that differ in construction from those discussed previously. The valve cartridge 206A can be employed as a suction valve assembly 207. The valve cartridge 206B can be employed as a discharge valve assembly 209. The valve cartridge 206A and the valve cartridge 206B can be identically constructed according to the example of FIG. 4. However, other examples contemplate that the construction of the valve cartridge 206A can differ in construction from the construction of the valve cartridge 206B.

Figure 5A:
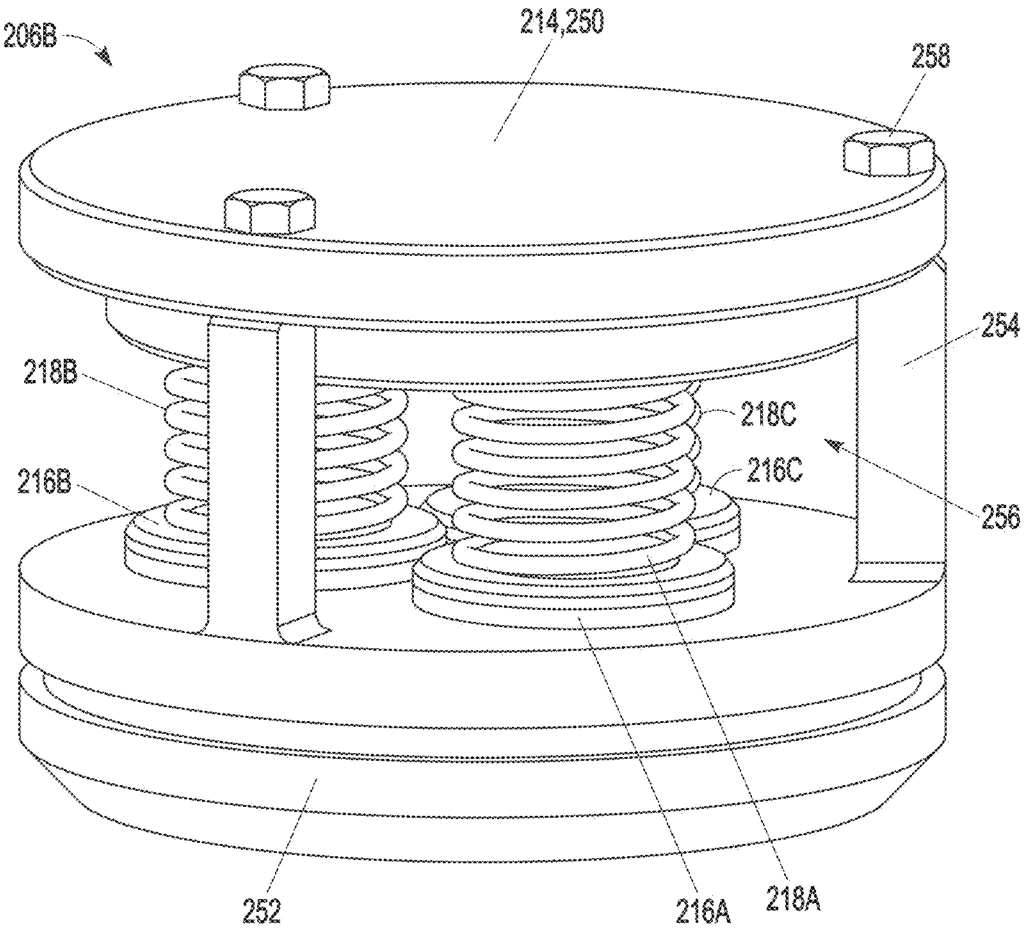
FIGS. 5A and 5B are perspective views of a second valve cartridge for the second fluid end of FIG. 4 according to another example of the present disclosure.
Figure 5B:
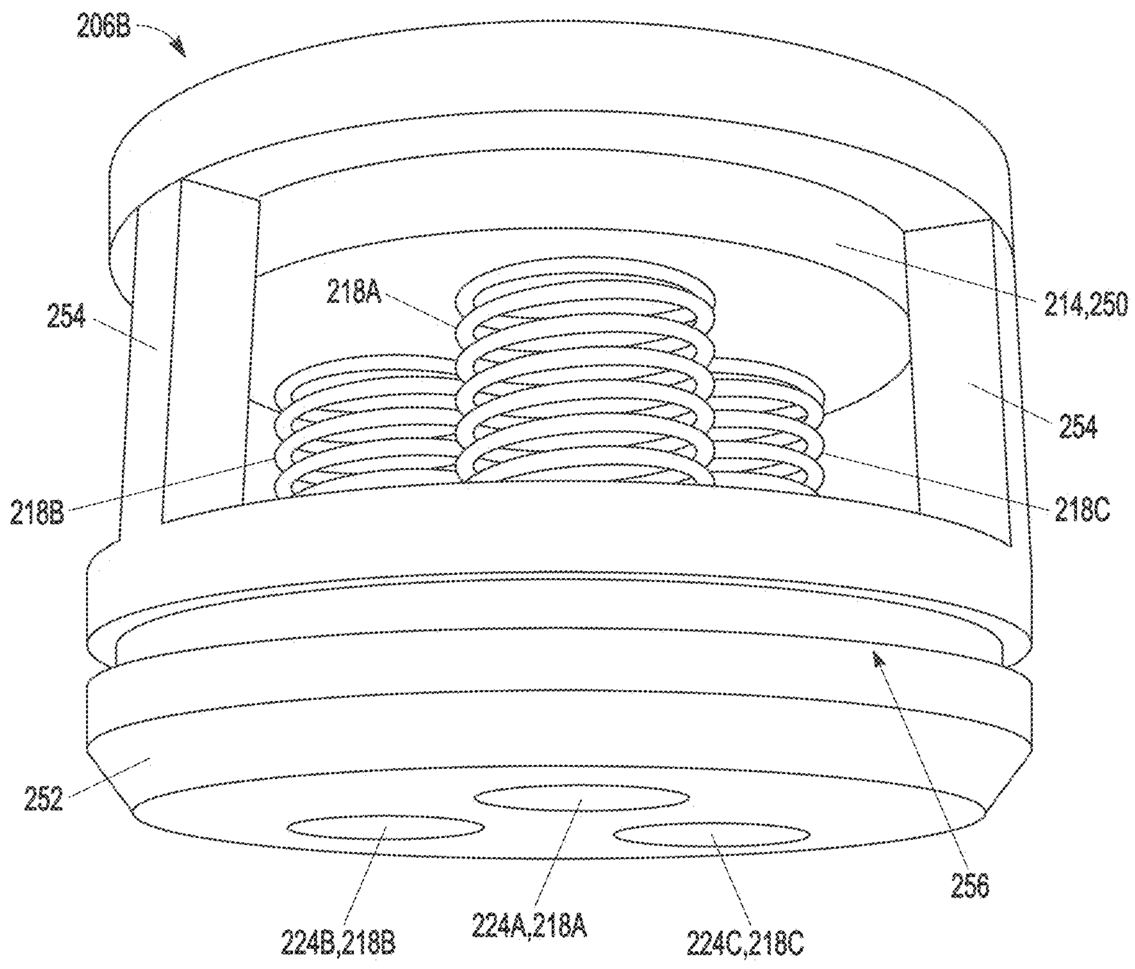

FIGS. 5A and 5B show perspective views of the valve cartridge 206B. The valve cartridge 206B differs from that valve cartridge 106 in several respects. First, the valve cartridge 206B includes one or more valve bodies comprising a plurality of valve bodies 216A, 216B and 216C (FIG. 5A), one or more springs comprising a plurality of springs 218A, 218B and 218C and one or more passages comprising a plurality of passages 224A, 224B and 224C (FIG. 5B) rather than single components as with the example discussed previously. Additionally, a housing 214 of the valve cartridge 206B has a construction that differs from that of the housing 114 discussed previously. In particular, the housing 214 includes a first end plate 250, a second end plate 252 and one or more sidewall members 254. The housing 214 can be configured with an open frame having openings 256 between the one or more sidewall members 254.

The one or more sidewall members 254 can extend between the first end plate 250 and the second end plate 252. The first end plate 250 can oppose the second end plate 252. The first end plate 250 can be coupled to the one or more sidewall members 254 via one or more fasteners 258. The one or more sidewall members 254 can be integral with or otherwise coupled to (e.g., welded, etc.) the second end plate 252. Alternative examples contemplate that the side wall members 254 can be integral with both end plates, can be separate components from the end plates joined thereto with weld, fastener, etc. or integral with the first end plate 250 rather than the second end plate 252.

The second end plate 252 can have the plurality of passages 224A, 224B and 224C extending therethrough as shown in FIG. 5B. The second end plate 252 can be configured to form a plurality of valve seats 228A, 228B and 228C as shown in FIG. 5B. The valve cartridge 206 differs from the valve cartridge 106 of FIGS. 1A-3 in that the first end plate 250 can be configured as a retainer for the plurality of springs 218A, 218B and 218C. Thus, a dedicated separate component acting as a retainer is not utilized. Additionally, the housing 214 does not include one or more passages on an opposing side of the valve cartridge 206B from the plurality of passages 224A, 224B and 224C but rather utilizes the openings 256 between the one or more sidewall members 254 for passage of the slurry fluid from the valve cartridge 206. Thus, the first end plate 250 has a solid construction with no passageways therethrough. The first end plate 250 can have features for retention of the plurality of springs 218A, 218B and 218C according to some examples.

Figure 6:
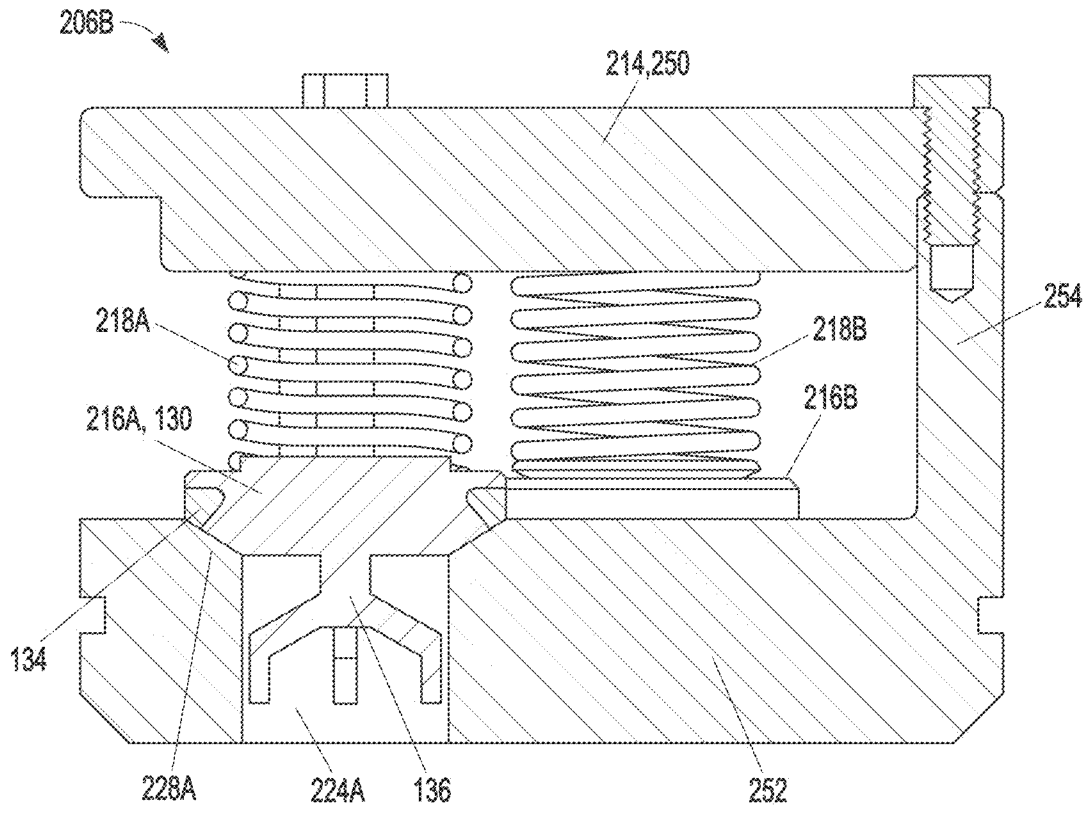
FIG. 6 is an enlarged cross-sectional view of the second valve cartridge of FIGS. 5A and 5B.
Figure 6A:
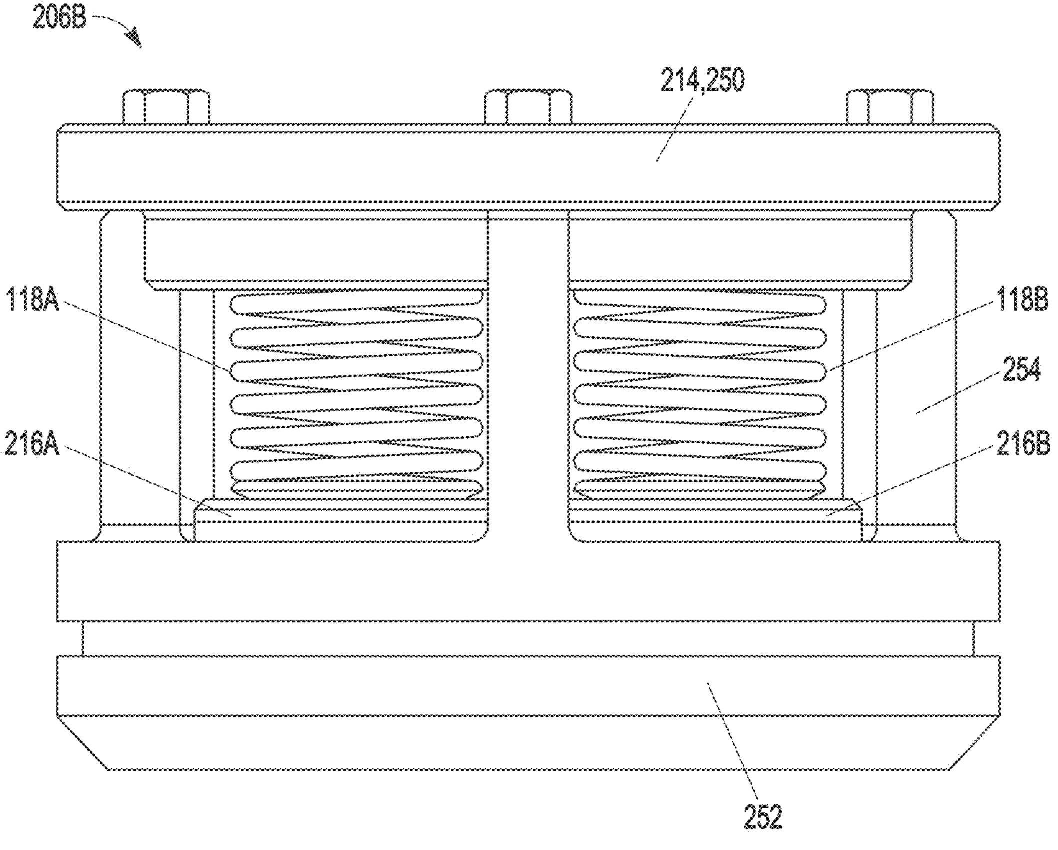
FIG. 6A is a side view of the second valve cartridge of FIGS. 5A-6.
Figures 6B, 7:
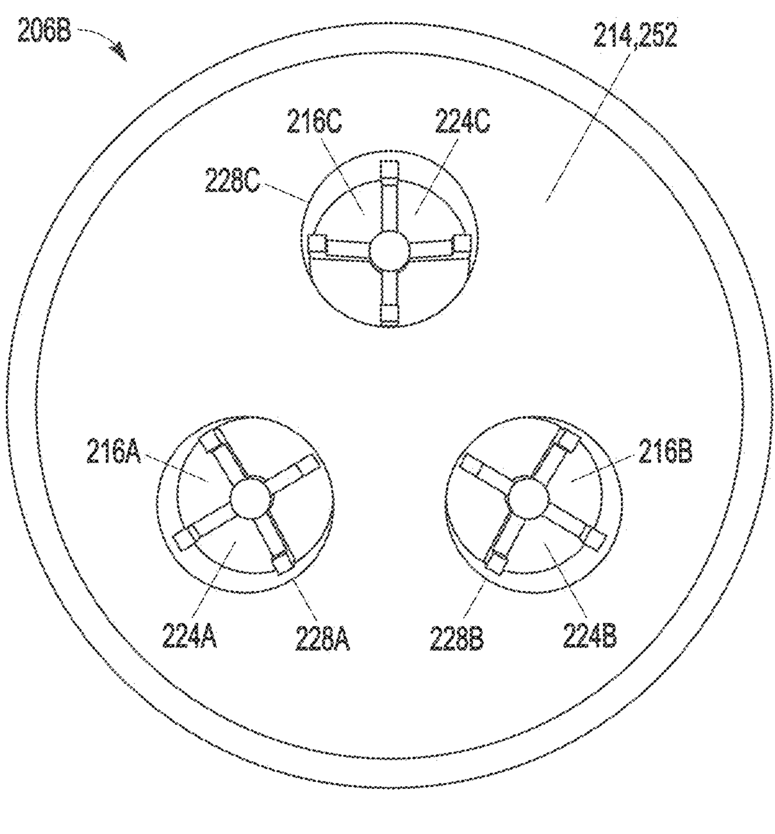
FIG. 6B is a plan view of the second valve cartridge of FIGS. 5A-6.
FIG. 7 is a flowchart illustrating a method of servicing a valve cartridge in accordance with an example of the present disclosure.

FIGS. 6-6B show further details of the valve cartridge 206B. As shown in FIGS. 6 and 6A, the valve cartridge 206B can include the housing 214, some of the plurality of valve bodies 216A and 216B and some of the plurality of springs 218A and 218B. The housing 214 can include the first end plate 250, a second end plate 252 and one or more sidewall members 254 as discussed previously. As shown in the cross-section of FIG. 6, the valve body 216A, for example, can include the first portion 130, the second portion 134, and the third portion 136 as discussed previously.

FIG. 6B is a plan view of the valve cartridge 206B including the plurality of passages 224A, 224B and 224C, the plurality of valve bodies 216A, 216B and 216C within and adjacent the plurality of passages 224A, 224B and 224C and the second end plate 252 with the plurality of valve seats 228A, 228B and 228C. The plurality of valve bodies 216A, 216B and 216C can each at least be partially positioned in a respective one of the plurality of passages 224A, 224B and 224C. The plurality of valve bodies 216A, 216B and 216C can interact with a respective one of the plurality of valve seats 228A, 228B and 228C as discussed previously.

FIG. 7 is a flow diagram of a method 300 of servicing a valve cartridge for a fluid end for a well stimulation pump. The method 300 can include at step 302 providing the valve cartridge as a unitary apparatus coupled to the fluid end. The valve cartridge can have a housing at least partially enclosing a valve body and a spring. The housing can form one or more passages therethrough. The housing can form one or more seats adjacent the one or more passages. The one or more seats can be configured to be selectively engaged by the valve body. The method 300 at step 302 can include removing the valve cartridge as a single unit from the fluid end without disassembling the housing, the valve body and the spring from one another.

The providing the valve cartridge can include the valve body is one of a plurality of valve bodies and the spring is one of a plurality of springs contained within the housing. The one or more seats can comprise a plurality of seats formed by the housing. According to some examples, the providing the valve cartridge includes the housing is configured with an open frame with one or more sidewall members extending between a first end plate and a second end plate. The providing the valve cartridge can include providing a retainer for the spring that is one of an end plate formed by the housing or an insert positioned within a recess formed by the housing. The method 300 can further include installing a second valve cartridge configured as a unitary apparatus within the fluid end after the removing the valve cartridge. The removing the valve cartridge can be via a dedicated window for accessing the valve cartridge for the servicing.

INDUSTRIAL APPLICABILITY

The present disclosure generally applies to the valve cartridge 106 and/or 206A, 206B for the fluid end 100 and/or 200 as shown in FIGS. 1 and 4. The valve cartridge 106 and/or 206A, 206B can be utilized as the discharge valve assembly, the suction valve assembly or both. The valve cartridge 106 and/or 206A, 206B is in fluid communication with the compression chamber 104 of the fluid end 100 or 200 via one or more conduits 108. The fluid end can include the suction plug 110 according to some examples to relieve pressure that can build in the compression chamber 104 for a variety of reasons.

In operation, the plunger actuates in a reciprocating fashion in and out of the compression chamber 104 (FIGS. 1 and 4). Depending on the direction of actuation of plunger, the valve cartridge 106 or 206A, 206B acting as the discharge valve assembly or suction valve assembly can actuate the valve body 116 or the plurality of valve bodies 216A, 216B and 216C away from the one or more seats 128 or plurality of valve seats 228A, 228B and 228C or can be maintained in the closed position (sealed position). More particularly, during a back stroke of the plunger, the action of the plunger can allow fluid to flow from a suction cavity (not shown) into the compression chamber 104. The suction cavity can be in fluid communication with a source containing the slurry fluid (a fracking fluid mixture). The slurry fluid may contain a fluid, such as water, and a proppant, such as sand.

During the back stroke of the plunger, the pressure in the compression chamber 104 drops below the pressure in the suction cavity (not shown) allowing the actuation of the valve cartridge 106 or 206A acting as the suction valve assembly. Such actuation moves the valve body 116 or the plurality of valve bodies 216A, 216B and 216C away from the one or more seats 128 or plurality of valve seats 228A, 228B and 228C and compresses the spring 118 or the plurality of springs 218A, 218B and 218C. In such a position for the valve body 116 or the plurality of valve bodies 216A, 216B and 216, the valve body 116 or the plurality of valve bodies 216A, 216B and 216 is/are no longer sealing the one or more seats 128 or plurality of valve seats 228A, 228B and 228C. This relative position opens up a path for the slurry fluid to flow through the one or more seats 128 or plurality of valve seats 228A, 228B and 228C past the valve body 116 or the plurality of valve bodies 216A, 216B and 216 and into the compression chamber 104.

During the back stroke of the plunger, the pressure drop in the compression chamber 104 generated by the plunger can cause the valve cartridge 106 or 206B acting as the discharge valve assembly to bias to the closed position (sealed position) to regulate flow of the slurry fluid. Put another way, the valve body 116 or the plurality of valve bodies 216A, 216B and 216 can be biased by the spring 118 or the plurality of springs 218A, 218B and 218C and can be forced by action of the plunger towards and to engagement with the one or more seats 128 or plurality of valve seats 228A, 228B and 228C. This engagement can seal an opening of the one or more seats 128 or plurality of valve seats 228A, 228B and 228C to stop flow of the slurry fluid from out of the compression chamber 104 through the discharge valve assembly.

During a forward stroke of the plunger, the process discussed above can be reversed as respects the discharge valve assembly and the suction valve assembly. The valve cartridge 106 or 206B can be actuated open by movement of the plunger and the slurry fluid can flow through the valve cartridge 106 or the valve cartridge 206B acting as the discharge valve assembly to an outlet (not shown). The valve cartridge 106 or 206A can be biased and actuated by movement of the plunger to the closed position (sealed position).

The present disclosure contemplates the valve cartridge 106 and 206A, 206B is the unitary apparatus 112 configured to be selectively removable from the fluid end 100 or 200 including the fluid end housing 102 as a single unit. This is due to the valve cartridge 106 and 206 being constructed as the unitary apparatus 112, which allows the housing 114 or 214, the valve body 116 or plurality of valve bodies 216A, 216B and 216C, the spring 118 or plurality of springs 218A, 218B and 218C and optionally other components if used to be removed together rather than being disassembled and removed piece-by-piece from the fluid end 100 or 200. This unitary apparatus 112 construction for the valve cartridge 106 and 206A, 206B can save significant time and labor costs previously associated with the piece-by-piece disassembly of valves utilized in fluid ends.

The above detailed description is intended to be illustrative, and not restrictive. The scope of the disclosure should, therefore, be determined with references to the appended claims, along with the full scope of equivalents to which such claims are entitled.

What is claimed is:

1. A valve cartridge for a fluid end housing for a well stimulation pump, comprising:

a valve body comprising a first portion, a second portion surrounding a perimeter of the first portion, and a third portion extending from the first portion;

a spring engaging the first portion of the valve body on a first side thereof;

a retainer engaging the spring on an opposing side thereof from the valve body; and a valve cartridge housing defining a first passage, having a first diameter, through a first end of the valve cartridge housing, a second passage, having a second diameter greater than the first diameter, axially aligned with the first passage through a second end of the valve cartridge housing, and a chamber between the first passage and the second passage, wherein the first portion of the valve body, the second portion of the valve body, and the spring are positioned within the chamber, wherein the valve cartridge housing is a single piece component that defines a seat at a transition between the first passage and the chamber, wherein the seat is configured to be selectively engaged by the first portion of the valve body on a second side thereof in a closed position of the valve body against the seat, wherein the third portion extends from the first portion into the first passage, and wherein the retainer is positioned within and coupled to the valve cartridge housing against a shoulder defined at a transition between the second passage and the chamber.

2. The valve cartridge of claim 1, wherein the seat is an interior portion of the valve cartridge housing.

3. The valve cartridge of claim 1, wherein the third portion of the valve body comprises a plurality of legs configured to guide the valve body in the passage.

4. The valve cartridge of claim 1, wherein a groove is defined in the seat of the valve cartridge housing, and wherein the second portion of the valve body is to meet with the groove in a closed position of the valve body against the seat.

5. The valve cartridge of claim 1, wherein the valve cartridge is configured to be installed in the fluid end housing in either a suction valve location or a discharge valve location.

6. A valve cartridge for a fluid end housing for a well stimulation pump, comprising:

a valve body comprising a first portion, a second portion surrounding a perimeter of the first portion, and a third portion extending from the first portion;

a spring engaging the valve body on a first side;

a retainer engaging the spring on an opposing side thereof from the valve body; and a valve cartridge housing defining a first passage, having a first diameter, through a first end of the valve cartridge housing, a second passage, having a second diameter greater than the first diameter, axially aligned with the first passage through a second end of the valve cartridge housing, and a chamber between the first passage and the second passage, wherein the first portion of the valve body, the second portion of the valve body, and the spring are positioned within the chamber, wherein the valve cartridge housing defines a seat, at a transition between the first passage and the chamber, that is configured to be selectively engaged by the valve body on a second side thereof in a closed position of the valve body against the seat, wherein the retainer is positioned within and coupled to the valve cartridge housing against a shoulder defined at a transition between the second passage and the chamber, and wherein the valve cartridge is a unitary apparatus that is configured to be installable into the fluid end housing or removable from the fluid end housing as a single unit.

7. The valve cartridge of claim 6, wherein the valve cartridge housing is a single piece component.

8. The valve cartridge of claim 6, wherein the seat is an interior portion of the valve cartridge housing.

9. The valve cartridge of claim 6, wherein the third portion extends from the first portion into the passage.

10. The valve cartridge of claim 9, wherein the third portion of the valve body comprises a plurality of legs configured to guide the valve body in the passage.

11. The valve cartridge of claim 6, wherein a groove is defined in the seat of the valve cartridge housing, and wherein the second portion of the valve body is to meet with the groove in a closed position of the valve body against the seat.

12. A method of servicing a valve cartridge for a fluid end housing for a well stimulation pump, comprising:

providing the valve cartridge as a unitary apparatus coupled to the fluid end housing, the valve cartridge having a valve cartridge housing, a valve body comprising a first portion, a second portion surrounding a perimeter of the first portion, and a third portion extending from the first portion, a spring, and a retainer engaging the spring, the valve cartridge housing defining a first passage, having a first diameter, through a first end of the valve cartridge housing, a second passage, having a second diameter greater than the first diameter, axially aligned with the first passage through a second end of the valve cartridge housing, and a chamber between the first passage and the second passage, wherein the first portion of the valve body, the second portion of the valve body, and the spring are positioned within the chamber, wherein the valve cartridge housing is a single piece component that defines a seat at a transition between the first passage and the chamber, wherein the seat is configured to be selectively engaged by the valve body in a closed position of the valve body against the seat, and wherein the retainer is positioned within and coupled to the valve cartridge housing against a shoulder defined at a transition between the second passage and the chamber; and removing the valve cartridge as single unit from the fluid end housing without disassembling the valve cartridge housing, the valve body, the spring, and the retainer.

13. The method of claim 12, wherein the valve cartridge housing is a single piece component.

14. The method of claim 12, wherein the seat is an interior portion of the valve cartridge housing.

15. The method of claim 12, wherein the third portion extends from the first portion into the passage, and wherein the third portion of the valve body comprises a plurality of legs configured to guide the valve body in the passage.

16. The method of claim 12, wherein a groove is defined in the seat of the valve cartridge housing, and wherein the second portion of the valve body is to meet with the groove in a closed position of the valve body against the seat.

* * * * *